United States
Gloge

[11] 3,821,549
[45] June 28, 1974

[54] SEMICONDUCTOR DRIFT PHOTODETECTOR FOR EQUALIZATION OF OPTICAL FIBER MATERIAL DISPERSION

[75] Inventor: Detlef Christoph Gloge, Red Bank, N.J.

[73] Assignee: Bell Telephone Laboratories, Incorporated, Murray Hill, Berkeley Heights, N.J.

[22] Filed: Sept. 18, 1973

[21] Appl. No.: 398,420

[52] U.S. Cl............... 250/211 J, 250/226, 250/227
[51] Int. Cl............................ G01j 3/34, G02b 5/14
[58] Field of Search.................. 250/211 J, 226, 227

[56] References Cited
UNITED STATES PATENTS

| | | | |
|---|---|---|---|
| 3,773,289 | 11/1973 | Gloge | 250/211 J |
| 3,777,149 | 12/1973 | Marcatili | 250/227 X |
| 3,777,150 | 12/1973 | Miller | 250/227 X |
| 3,781,550 | 12/1973 | Zeidler | 250/211 J |

Primary Examiner—Archie R. Borchelt
Assistant Examiner—T. N. Grigsby
Attorney, Agent, or Firm—D. I. Caplan

[57] ABSTRACT

An optical signal having a non-negligible bandwidth suffers a distortion while propagating in an optical fiber caused by the fact that signal components of different optical wavelengths propagate at different velocities through the fiber material, that is, by the dependence of refractive index upon wavelength (material dispersion). In order to compensate for this distortion, an optical prism (or diffraction grating) is located in the path of the output wave exiting from the fiber, which angularly separates the various output wavelengths. The angularly separated output waves are then incident upon a semiconductor P-N junction detector of the charge carrier drift type, such that the time delays of different wavelengths in the fiber are compensated by the different drift time delays of the different charge carriers generated by the different wavelengths absorbed in the drift region of the semiconductor.

10 Claims, 1 Drawing Figure

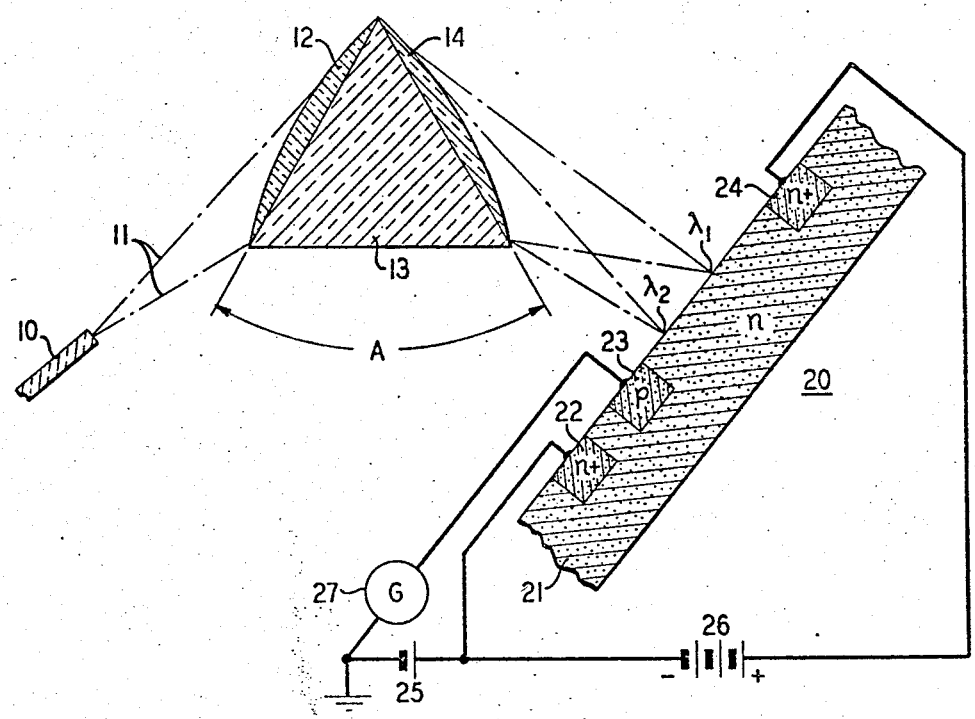

3,821,549

SEMICONDUCTOR DRIFT PHOTODETECTOR FOR EQUALIZATION OF OPTICAL FIBER MATERIAL DISPERSION

FIELD OF THE INVENTION

This invention relates to optical communications systems, and more particularly to semiconductor photodetector delay equalizers for use in such systems.

BACKGROUND OF THE INVENTION

In the transmission of optical signals through optical fibers in optical communication systems, the optically transparent material of the fiber is characterized by a dependence of the refractive index upon optical wavelength (material dispersion). Hence, different optical wavelengths undergo different time delays while propagating through the fiber from its input end to its output end. When using a broadband optical source for producing the optical carrier wave in the fiber, such as a light emitting semiconductor diode (LED), a relatively narrow input signal pulse of time duration $t_1$ at the input end of the fiber exits from the output end of the fiber as a relatively broad output signal pulse of duration $t_2$ greater than $t_1$ by an undesirably large amount. This broadening of the output pulse is proportional to the difference of time delays in the fiber of the different optical wavelength components supplied by the optical source. Thereby, the optical fiber material dispersion sets an undesirably low limit on the maximum signal bit transmission rate obtainable in a given optical transmission system, particularly of the kind including a given incoherent optical source supplying an optical carrier wave having a spread, of the order of 500 angstroms, of differing wavelength components for transmission through a given optical fiber. Even in many types of multimode fibers, this problem of fiber material dispersion imposes a more severe limitation upon the maximum information bit rate obtainable than that imposed by the problem of mode delay, because of the various mode delay differences (mode dispersion) are substantially smaller than the fiber material-induced delays. Therefore, it would be desirable to have a means for reducing the distortion-broadening (in time) of optical signal pulses propagating through an optical fiber caused by the fiber's material dispersion.

SUMMARY OF THE INVENTION

In order to compensate for optical fiber material dispersion, an optical prism (or diffraction grating) is located at the exit end of the optical fiber so that the optical wave exiting from the fiber is incident on the prism. The prism thereby deflects the different wavelength components through different angles of deflection and directs these components onto a semiconductor photodetector of the charge carrier drift type having a delay line portion which is terminated in a P-N junction charge carrier detector. The semiconductor drift detector is arranged so that the different wavelength components are absorbed in this delay line portion at a suitable distance from the P-N junction such that the different time delays undergone in the fiber by these different wavelength components are compensated by the different time delays of the correspondingly different drifting charge carriers. This is achieved by geometrically arranging the charge carrier drift region of the semiconductor such that those wavelength components which are most delayed in the optical fiber are incident and absorbed at locations in the drift region closest to the P-N junction, and those wavelength components which are least delayed in the fiber are absorbed at locations in the drift region farthest from the P-N junction. Thereby, the charge carriers generated by the absorption of the optically more delayed wavelength components from the fiber are less delayed on drifting through the drift region to the detecting P-N junction.

In a specific embodiment of this invention, the output wave exiting from an optical fiber is incident upon an optical prism which angularly separates the optical wavelength components in the output. These wavelength components are incident upon a major surface portion of an $n$-type semiconductor body at locations between a pair of localized strongly $n$-type ($n^+$) conductivity zones. The $n$-type body can be an epitaxially grown semiconductor layer, for example. In operation, the optical radiation from the fiber produces charge carriers at various locations in the semiconductor drift region where the various optical wavelength components are absorbed. A drift field, produced by a steady voltage applied across the ohmic contacts, causes the majority charge carriers (i.e., electrons) to drift towards a reversed biased P-N junction. When the various drifting minority charge carriers reach the P-N junction where the electric field is significantly higher than in the drift region, a current is produced in the external circuit.

By suitably choosing the dispersive power of the optical prism, as well as suitably locating and orienting the semiconductor body portion with its P-N junction, the various time delays of the drifting charge carriers (between the time of creation by optical absorption and the time of detection at the P-N junction) can be made at least approximately to equalize (compensate for) the various time delays of corresponding wavelength components undergone in propagating through the fiber. Speaking in this approximation, the time delays in the fiber vary approximately linearly with wavelength; the angle of deflection caused by the prism varies approximately linearly with wavelength, hence the positions at which the wavelength components are absorbed in the semiconductor body vary approximately linearly with distance from the P-N junction, so that the drift time delays also vary approximately linearly with wavelength but in a compensating sense with respect to the delays in the fiber. While the invention described herein is directed at solving similar problems to those treated in the patent application of H. Melchior Case 2 filed simultaneously herewith, this invention was conceived independently therefrom.

BRIEF DESCRIPTION OF THE DRAWING

This invention, together with its objects, features, and advantages, can be better understood from the following detailed description when read in conjunction with the drawing in which the FIGURE is a diagram, partly in cross section, of apparatus for equalization of optical fiber material dispersion, in accordance with a specific embodiment of the invention. For the sake of clarity only, the drawing is not to scale.

DETAILED DESCRIPTION

As shown in the FIGURE, the output end of an optical fiber 10 supplies an output optical wave 11 incident upon a converging spherical lens 12 located on the input face of an optical prism 13. The lens 12 can alternatively be a cylindrical converging lens. The output wave 11 contains optical carrier components (modulated by an information signal) supplied to the input end of the fiber (not shown) by an optical carrier wave source such as a gallium arsenide light emitting diode (not shown). The wavelength spread in the optical carrier wave is typically about 400 angstroms. After passing through another spherical (alternatively cylindrical) converging lens 14, located on the output face of the prism 13, the various wavelength components are focused onto a major surface of an n-type semiconductor body portion 21 of a semiconductor charge carrier drift detector 20 at locations between a pair of localized $n^+$ (*strongly n*) conductivity type surface zones 22 and 24. These $n^+$ *zones are for external ohmic contact to a battery 26 which is connected for producing a drift field in the drift region between these $n^+$ zones in the semiconductor body portion.* A p-type conductivity surface zone 23 is also located in this semiconductor body portion, advantageously relatively closer to the $n^+$ zone 22 than to the $n^+$ zone 24 to which the positive terminal of the battery 26 is connected. The region of the semiconductor between the p zone 23 and the $n^+$ zone 24 thereby provides a drift region for charge carriers generated therein. Advantageously, the dimensions of the $n^+$ zones 22 and 24 are sufficiently large, particularly in the direction perpendicular to the plane of the drawing, so that the vast majority of the generated charge carriers drift in mutually parallel lines to the detecting P-N junction formed by zones 22 and 23, to prevent further pulse broadening otherwise caused by differing drift distances of electronic charge carriers corresponding to the same wavelength components absorbed in the delay line portion at different lateral positions.

In operation, the electronic holes of the electron-hole pairs are created in the drift region at different locations by absorption therein of the different optical wavelength components (focused by the lens 14 therein), and these holes then drift toward the P-N junction detector formed by the p zone 23 and the $n^+$ zone No. 22. This P-N junction is under a reverse bias supplied by another battery 25. (By reverse bias is meant that the p-type zone 23 is electrically negatively biased by the battery 25 with respect to the $n^+$ zone 25.) When these drifting electrons reach this P-N junction, they cause a change in external current through a current detector 27 connected in series with the battery 25 and the aforesaid P-N junction.

The theory of optical dispersion equalization is as follows. Those optical wavelength components which are most time-delayed in the fiber material are most deflected by the dispersive material of the prism 13 and are focused onto the exposed major surface of the semiconductor 21 at locations nearest the P-N junction between zones 22 and 23. Thus, the holes, produced by absorption in the semiconductor of these most delayed wavelength components in the fiber material, drift to the P-N junction with the least drift delay time. Thereby, the (electron) charge carrier drift times tend to compensate for the corresponding optical fiber material delay times. In mathematical terms, the time delay $t_f$ in the fiber 10 can be expressed as:

$$t_f = Ln''/c \qquad 1$$

where
L is the length of the fiber;
$n'' = n' - \lambda(dn'/d\lambda)$ is the group index of the fiber;
$n'$ is the refractive index of the fiber; and
$c$ is the speed of light in vacuum.

The distance $x$ from the P-N junction (in a direction parallel to the electric field established by the battery 26 connected by ohmic contacts across zones 22 and 24) at which a given wavelength component is directed upon and absorbed by the semiconductor 21 is given by:

$$x = -(n-n_0)Al \qquad 2$$

where:
$n$ is the refractive index in prism 13 of the given wavelength component;
$n_0$ is the refractive index in the prism 13 of a reference wavelength;
$A$ is a constant which is approximately equal to the apex angle of the prism measured in radians, for angles less than about 60°, as known in the art; and
$l$ is the distance from the prism to the major surface of the semiconductor body 21.

Thus, the difference in drift delay times, $t_1 - t_2 = \Delta t_D$, in the corresponding charge carriers drifting to the P-N junction after having been generated by wavelength components $\lambda_1$ and $\lambda_2$, for example, is given by:

$$\Delta t_D = \Delta x/v_D = -(\Delta n)Al/v_D \qquad 3$$

where $v_D$ is the drift velocity of electrons in the drift region of the semiconductor body portion. On the other hand, from equation (1) above, the difference in optical delay times $\Delta t_F$ of these same wavelength components in the fiber 10 is given by:

$$\Delta t_F = L(\Delta n'')/c \qquad 4$$

where $\Delta n''$ is the difference in refractive indices of the wavelength components corresponding to $\lambda_1$ and $\lambda_2$ in the fiber 10. For equalization of delay times, $\Delta t_D$ and $\Delta t_F$ should add to zero; so that, combining equations (3) and (4), it is found that equalization is achieved if:

$$Al/v_D = (\Delta n''/\Delta n)(L/c) \qquad 5$$

Thus, as long as $(\Delta n'')/(\Delta n)$ is independent of wavelength in a linear approximation, the condition expressed by equation (5) can be satisfied for all carrier wavelength components propagating in the fiber for a given length L of the fiber 10, by appropriate selection of the distance $l$ between the prism 13 and the detector 20. In this connection, it should be noted that the drift electric field produced by the battery 26 is typically about 100 volt/cm, to yield an electron drift velocity typically of about $4.4 \times 10^4$ cm/sec.

In a typical example, by way of illustration only, the n-type semiconductor body portion 21 is silicon having a substantially uniform bulk resistivity of about 200 ohm centimeters. This body portion 21 typically is an epitaxial layer 200 microns thick, for example as formed on a high resistivity substrate (not shown) by conventional epitaxial growth techniques. The $n^+$ zone 24 is about 40 microns deep beneath the surface of the body 21 and has a net significant impurity concentration of about $10^{18}$ per cubic centimeter. The $n^+$ zone 22 is similar in all respects (except position) to the $n^+$ zone 24. The $p$ zone 23 is likewise about 40 microns in depth and has a substantially uniform net significant impurity concentration of about $10^{17}$ per cubic centimeter. The battery 26 has a voltage which is sufficient to produce an electric field in the drift region of the semiconductor body 21 of about 100 volts per centimeter. The battery 25 provides a reverse bias of about 20 volts across the zones 22 and 23 of P-N detecting junction.

In order to form the localized surface zones 22, 23 and 24, well-known geometrically selective impurity diffusions or ion implantations can be used; or alternatively, alloy diffusions can be used as known in the art.

It should be understood that the locus of points, where various optical wavelength components are focused by the lens 14 onto the semiconductor drift region in the body portion 21, forms a path which advantageously is parallel to the direction of the drift field produced in drift region by the battery 26 connected across $n^+$ zones 22 and 24. However, this configuration is not essential, it being required only that said path have a substantial component parallel to the drift field direction.

Although this invention has been described in terms of a specific embodiment, various modifications can be made without departing from the scope of this invention. For example, it should be obvious to the worker in the art that the various zones of conductivity types $n$ and $p$ can be mutually interchanged in the semiconductor body 21. When using an optical grating instead of the prism 13, it should be understood that the deflections produced by the grating correspond to "anomalous" dispersion of a prism. Although the specific embodiment described above was in terms of "normal" optical dispersion in the prism 13, it should be obvious that this invention can be practised in the case of "anomalous" dispersion in the prism, it being further understood that in case the dispersion of the prism is changed to "anomalous", the detector 20 should be turned around (rotated by 180° about an axis perpendicular to its major surface) for a given fiber material, so that the charge carriers drift in the opposite sense of direction, in order to preserve the proper sense of the charge carrier drift delays in compensation for the optical propagation delays due to optical fiber material dispersion.

What is claimed is:

1. Apparatus for equalization of optical fiber material dispersion which comprises:
   a. a semiconductor body portion terminated in a P-N junction, said portion having a drift region in which charge carriers can drift to said P-N junction;
   b. optical deflection means for deflecting optical radiation exiting from the fiber in accordance with the wavelength of components of said radiation onto said drift region, such that those wavelength components which are more delayed in propagating through the fiber are incident upon the drift region at locations less remote from the P-N junction, whereby the charge carriers generated by absorption of said more delayed wavelength components in the said drift region are less delayed while drifting to the P-N junction.

2. Apparatus according to claim 1 in which said optical deflection means deflects the radiation through an angle which varies at least approximately linearly with the wavelength of said components, so that these wavelength components are directed for absorption in the semiconductor body portion at locations whose distances from the P-N junction vary at least approximately linearly with said wavelength.

3. Apparatus according to claim 2 which further includes said fiber characterized in that the time delays of said wavelength components propagating through the fiber vary at least approximately linearly with said wavelength.

4. Apparatus according to claim 2 which further includes means for electrically reverse-biasing said P-N junction during detector operation.

5. Apparatus according to claim 1 which further includes means for electrically reverse-biasing said P-N junction during detector operation.

6. Apparatus according to claim 1 which further includes optical means for focusing said wavelength components upon the said semiconductor portion at said locations, in cooperation with said optical deflection means.

7. Apparatus according to claim 6 in which said optical deflection means comprises an optical prism.

8. Apparatus according to claim 6 in which said deflection means comprise an optical grating.

9. Apparatus according to claim 1 in which said optical deflection means comprise an optical prism.

10. Apparatus according to claim 1 in which said deflection means comprise an optical grating.

* * * * *